United States Patent Office 2,799,512
Patented July 16, 1957

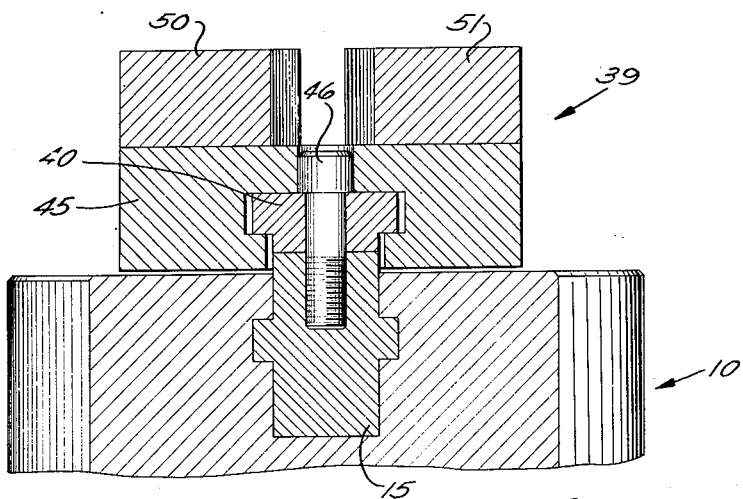
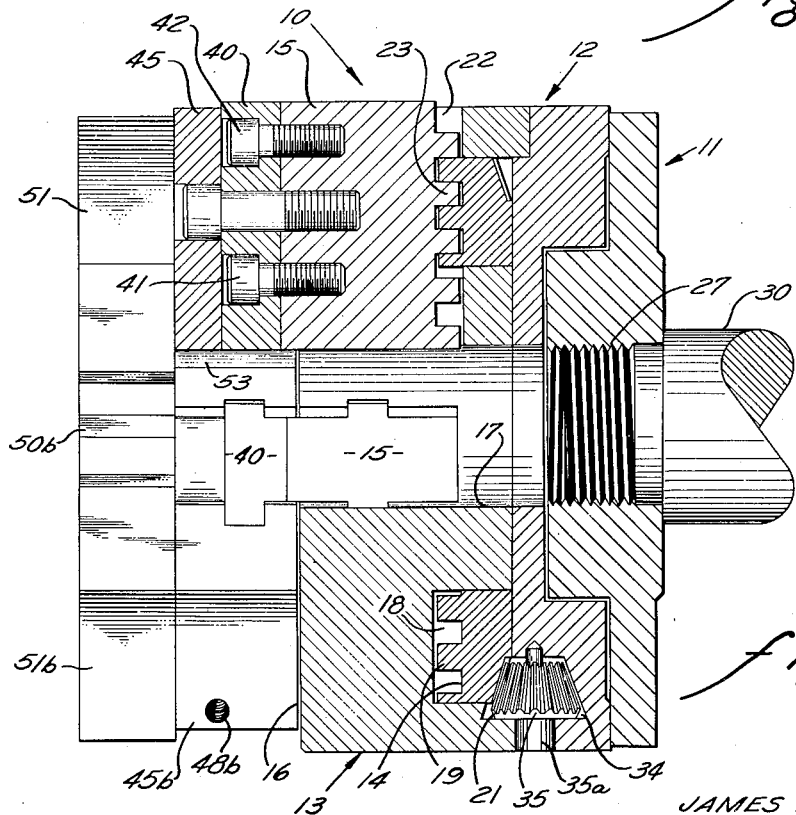

2,799,512

CHUCK CONSTRUCTION FOR PRESSURE EQUALIZATION

James R. Buck, Richland Township, Kalamazoo County, and Russell E. Buck, Scotts, Mich., assignors to Buck Tool Company, Kalamazoo, Mich., a corporation of Michigan Application August 10, 1955, Serial No. 527,506

4 Claims. (Cl. 279—123)

This invention relates to an improved chuck construction and more particularly to a universal chuck construction which will enable the jaws thereof to accommodate a wide variety of shapes of work and yet maintain an equal pressure thereon.

In chucking irregular, including out-of-round, objects, a serious problem arises in attempting to have each of the work contacting jaws exert an equal pressure on the work. Further, in many situations it is desirable to provide as many work contacting jaws as possible to eliminate distortion of the work as well as to minimize the pressure exerted on the work by each of the jaws and thereby prevent marking of the work. Insofar as we are aware no simple and inexpensive chuck construction, universal or other type, exists which includes these desirable qualities and features.

Accordingly, it is an object of this invention to provide an improved chuck construction, particularly universal, in which the work contacting jaws each exert a substantially equal pressure on the work.

It is a further object of this invention to provide an improved universal chuck construction employing radially movable slides in which a plurality of work contacting jaws are mounted on and actuated by a single slide.

It is a further object of this invention to provide an improved universal chuck construction in which the work contacting jaws can pivot to a limited extent to adjust the pressure which is exerted against the work.

It is a further object of this invention to provide an attachment for a conventional chuck which attachment provides additional work contacting jaws, which jaws are adapted to exert equal pressure on the work.

Other objects and advantages of this invention will become apparent to those acquainted with equipment of this type upon reading the following description and inspecting the accompanying drawings, in which:

Figure 3 is a sectional view taken along the line III—III of Figure 1.

Figure 4 is a sectional view taken along the line IV—IV of Figure 1.

*General description*

In general, our invention provides a chuck body 10 having a plurality, here three, of radially directed slides upon which are mounted jaw moving structures 39, 39a and 39b. The jaw moving structures move radially with the slides but are capable of pivotal movement with respect thereto so as to maintain an even pressure on the work.

*Detailed description*

Figure 1:
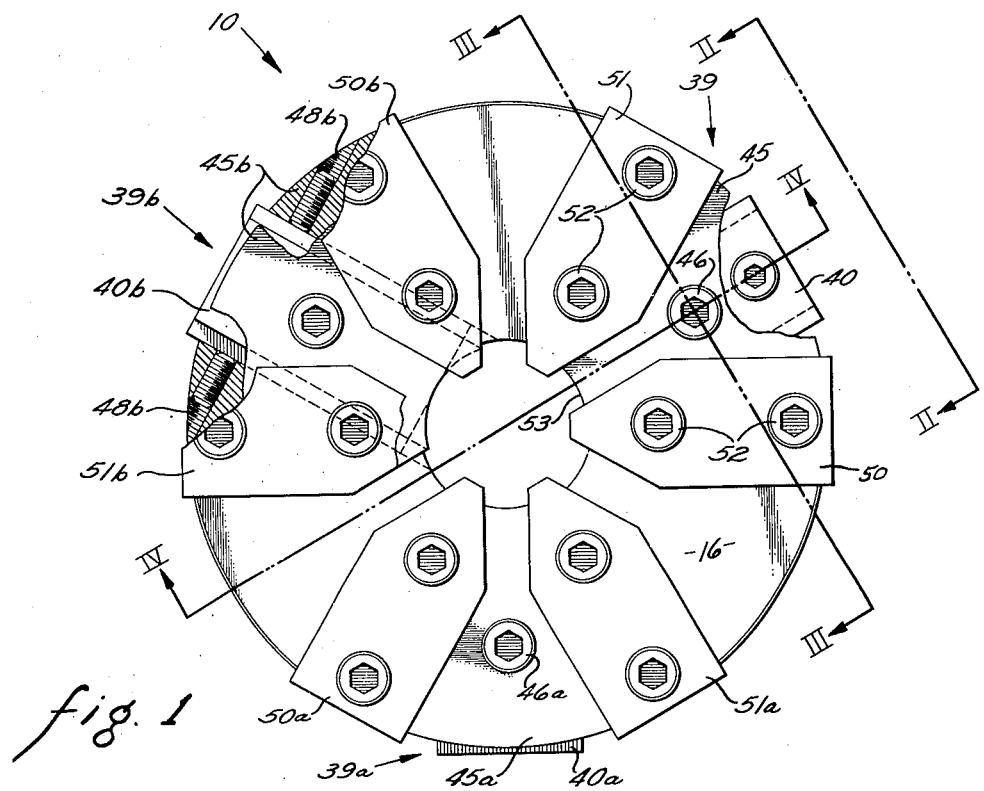
Figure 1 is a front elevation view of the chuck, with parts thereof being partially broken away.
Figure 2:
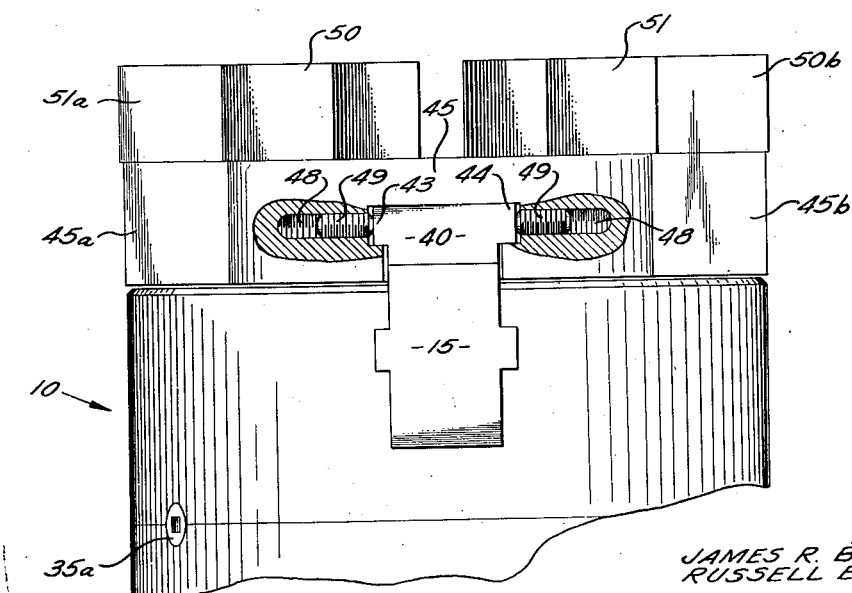
Figure 2 is an elevation view taken along the line II—II of Figure 1 with parts thereof being partially broken away.

The chuck body 10, as most clearly shown in Figure 4, is comprised of a mounting adapter 11, a base member 12, and a ring member 14. The cap member 13 has a planar front face 16 and a cylindrical, co-axial work opening 17 extending therethrough. The rearward end of the cap member 13 is provided with an annular recess 18, coaxial therewith, in which the ring member 14 is rotatably disposed. The front face of the ring member 14 is provided with a conventional spiral gear having teeth 19 and the rear face of the ring member 14 has teeth 21 comprising a conventional integral beveled gear. A suitable pinion chamber 34 is provided partially in the base member 12 and partially in the cap member 13 for reception of the beveled gear pinion 35 operable by conventional means such as a key entering through opening 35a at the periphery of chuck 10 (Figure 2). The pinion 35 is preferably disposed so that the teeth thereof are engageable with the beveled gear teeth 21 on the ring member 14 as is conventional with scroll-type chucks.

The front face 16 of the cap member 13 is provided with a plurality, here three, of equally spaced, radially disposed guideways 22, of any convenient, conventional type, into which appropriate slides 15 are radially slidably disposed. The sliders may conveniently be the master jaws of a conventional type chuck. The rear end of each slider is provided with teeth 23 for appropriate intermeshing with the spiral gear teeth 19 and the ring member 14. The adapter 11 is provided with a partially threaded, co-axial, spindle opening 27, for engaging a lathe spindle 30.

The structure thus far described is the same as that disclosed in our United States Patent No. 2,639,157, issued May 19, 1953. Reference may be made to this patent for a more detailed description of the chuck and its manner of operation. It is to be understood that the chuck described above illustrates one specific chuck on which the invention about to be described can be used and is given for illustrative purposes only. It is apparent that the invention can be used on any chuck employing radially movable sliders. In particular, the invention is not limited to use on a scroll-type chuck such as is described above but may be used on power chucks, such as the type illustrated in our copending application Serial No. 461,203, now Patent No. 2,763,488.

The jaw moving structures 39, 39a and 39b are identical with each other and therefore only jaw structure 39 will be described in detail herein. Corresponding parts on the other jaw structures 39a and 39b will be identified by the same reference character with the suffix "a" or "b" applied thereto.

The jaw moving structure 39 includes a head member 40 affixed to slide 15 by tap bolts 41 and 42. The head member is formed with outwardly extending flanges 43 and 44 (Figure 2) along the side edges thereof.

A cap member 45 engages the outer face of the head member 40 and surrounds and slidingly engages the flanges 43 and 44 thereof. A tap bolt 46 extends through the head member 40 and into the slide for securing the cap member to the slide for radial movement therewith but permits pivotal movement of the cap member 45 with respect to the slide 15.

A pair of openings 48 extend through the side walls of the cap member 45 in alignment with the flanges 43 and 44 of the head member. Headless set screws 49 are threaded in the openings 48 until they are a predetermined distance from the flanges 43 and 44. The set screws limit the pivotal movement of the cap member 45 by binding against the flanges 43 and 44. The clearance between the set screws 49 and the flanges determines the limits of the pivotal movement of the cap member. The set screws 49 can be threaded into engagement with flanges 43 and 44 to hold the cap member 45 rigid with respect to the head member 40 while the jaws 50 and 51 are being turned or reworked to the exact form of the work piece to be turned.

A pair of spaced, radially directed work contacting jaws 50 and 51 are secured to the cap member near the side edges thereof by bolts 52. The work contacting edges of jaws 50 and 51 extend radially inwardly of the arcuate, concentric inner edge 53 of cap member 45.

Operation

The slides 15 are moved radially by rotation of the pinion 35 in a conventional manner. Since the bolt 46 secures the cap member 45 to the slide 15 fixedly, insofar as radial movement is concerned, the cap plate and jaws 50 and 51 will move radially with the member 45. The jaws 50 and 51 will contact the periphery of the work at equally spaced intervals therealong. Should the work have any small irregularities, the cap members 45, 45a and 45b will pivot to a limited extent about bolts 46, 46a and 46b to equalize the pressure exerted by the jaws on the work and thereby prevent breakage of the work or jaws and eliminate distortion or marking of the work by the jaws.

The particular construction disclosed employing three slides 15 and six work contacting jaws is particularly advantageous since the radial movement of the three slides insures centralizing of the work while the six jaws surround the work to eliminate distortion thereof. Only one-half as much pressure is exerted by the jaws or the work in the present construction as would be exerted by the jaws of a conventional three jaw chuck yet the chuck construction and operating mechanism is the same as for the three jaw chuck. Since the jaws can pivot, they can adjust themselves so that an approximately equal pressure is exerted on each jaw even though the work is slightly out-of-round or otherwise irregular.

It is apparent that the construction of the present invention can be applied as an attachment to any conventional chuck employing two or more radially moving slides. Thus with conventional chucks employing slides, which ordinarily are the chuck jaws of the chuck, the head member 40, cap member 45 and jaws 50 and 51 can be readily attached and detached as desired.

Although the above mentioned drawings and description apply to one particular, preferred embodiment of the invention, it is not our intention, implied or otherwise, to eliminate other variations or modifications of the invention which do not depart from the scope of the invention unless specifically stated to the contrary in the hereinafter appended claims.

We claim:

1. In a chuck construction, the combination comprising: a chuck body; said chuck body being shaped to define a plurality of equally spaced, radially disposed guideways in one face thereof; slides mounted in said guideways for sliding movement therealong; a flanged head member fixedly mounted on each said slide; a cap member secured to each said slide and surrounding the flange on said head member, said cap member being mounted for radial movement with respect to said chuck body, with said slide and for pivotal movement with respect to said slide; means on said head member and said cap member for limiting pivotal movement of said cap member; and a plurality of spaced, radially directed, work contacting jaws on each said cap member.

2. In a chuck construction, the combination comprising: a chuck body; said chuck body being shaped to define a plurality of radially disposed guideways in one face thereof; slides mounted in said guideways for movement therealong; a cap member overlying substantially the entirety of each said slide, means extending through the central portion of said cap member pivotally securing same to said slide for radial movement thereof with respect to said chuck body with said slide and for pivotal movement with respect to said slide; means fixed with respect to said slide engaging said cap member and limiting the pivotal movement of said cap member; and a plurality of spaced, radially directed work contacting jaws on each said cap member.

3. In a chuck construction, the combination comprising: a chuck body, said body having a central opening therethrough, the face of said chuck body being shaped to define a plurality of radially disposed, equally spaced guideways; slides mounted in said guideways for sliding movement therealong; an elongated head member fixedly secured to said slides along the outside faces thereof, each said head member having outwardly directed flanges extending along either side thereof; a cap member surrounding the outside face of each said head member and the flanges thereof; means secured to said slide and extending through said head member into said cap member supporting said cap member for radial movement with the slide and for pivotal movement with respect to said slide, the radially inner edge of said cap member being arcuate and concentric with the axis of said central opening; a pair of spaced radially directed work contacting jaws fixedly mounted on said cap member adjacent the side edges thereof, said jaws including gripping member extending radially inwardly of said arcuate edge of said cap member.

4. In a chuck construction, the combination comprising: a chuck body having a plurality of radially disposed guideways in one end face thereof; a slide mounted in each of said guideways for radial movement; a cap member secured to each slide for radial movement therewith and for limited pivotal movement with respect thereto; and a pair of circumferentially spaced, substantially radially directed jaws fixed to each cap member.

References Cited in the file of this patent

UNITED STATES PATENTS

| 2,523,374 | Jensen | Sept. 26, 1950 |
| 2,591,389 | Wallace | Apr. 1, 1952 |
| 2,690,915 | Pealer | Oct. 5, 1954 |